United States Patent [19]

DaFoe

[11] Patent Number: 5,567,099
[45] Date of Patent: Oct. 22, 1996

[54] TWO-PART BLIND RIVET

[76] Inventor: John DaFoe, 1809 Maritime Mews, Vancouver, B.C., Canada, V6H 3W7

[21] Appl. No.: 504,426

[22] Filed: Jul. 20, 1995

[51] Int. Cl.⁶ .............................. F16B 13/06; F16B 15/00
[52] U.S. Cl. ............................... 411/54; 411/359; 411/448
[58] Field of Search .................................. 411/24, 27, 28, 411/54, 357, 358, 359, 448

[56] References Cited

U.S. PATENT DOCUMENTS

| 1,106,767 | 8/1914 | Young | 411/359 |
| 1,204,330 | 11/1916 | Adair | 411/359 |
| 1,525,822 | 2/1925 | Nalle | 411/359 X |
| 4,181,061 | 1/1980 | McSherry . | |
| 4,555,838 | 12/1985 | Müller . | |
| 4,610,072 | 9/1986 | Müller . | |
| 4,614,471 | 9/1986 | Mauritz . | |
| 4,645,394 | 2/1987 | While et al. | 411/358 X |
| 4,685,847 | 8/1987 | Kessler . | |

FOREIGN PATENT DOCUMENTS

| 592497 | 8/1925 | France | 411/359 |
| 212426 | 3/1924 | United Kingdom | 411/358 |
| 1392031 | 4/1975 | United Kingdom | 411/358 |

Primary Examiner—Neill R. Wilson
Attorney, Agent, or Firm—Nixon & Vanderhye

[57] ABSTRACT

A blind rivet has a first part comprised of a central core having depending circumferentially spaced legs spaced radially from the axis of the first part and radially projecting, circumferentially spaced flanges at an upper end forming a head for the first part. The second rivet part includes a bulbous lower end having an upstanding central core with radially outwardly projecting legs. The legs of the second part are spaced circumferentially from one another and, above the core, are spaced radially from the axis. Upon inserting the first part into the second part, cam follower surfaces on the distal ends of the legs of the first part engage and are cammed outwardly by cam surfaces in curved chaseways between the legs of the second part to set the rivet and grip the undersurface of the elements being connected. The flanges of the first part are received in the spaces between the flanges of the second part and engage the outer surface of the outer element to be connected.

12 Claims, 6 Drawing Sheets

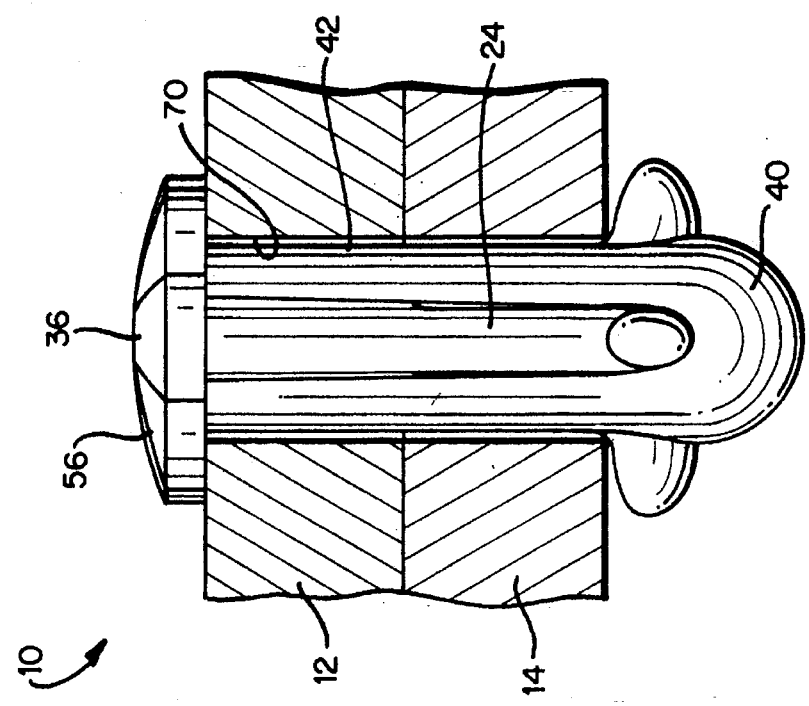
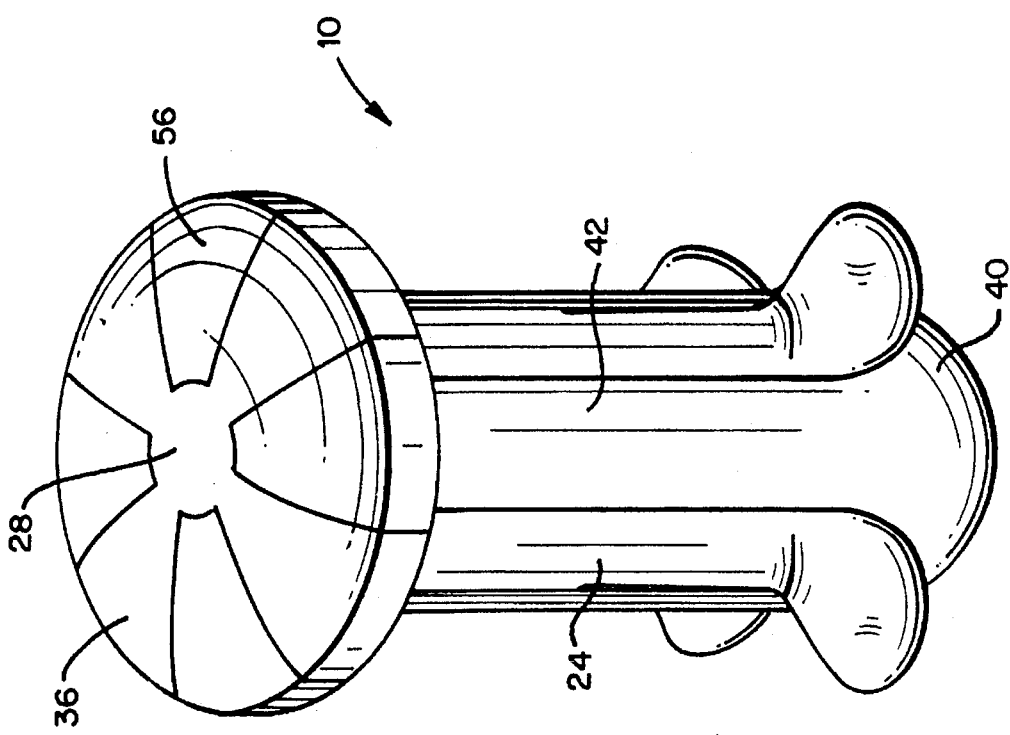

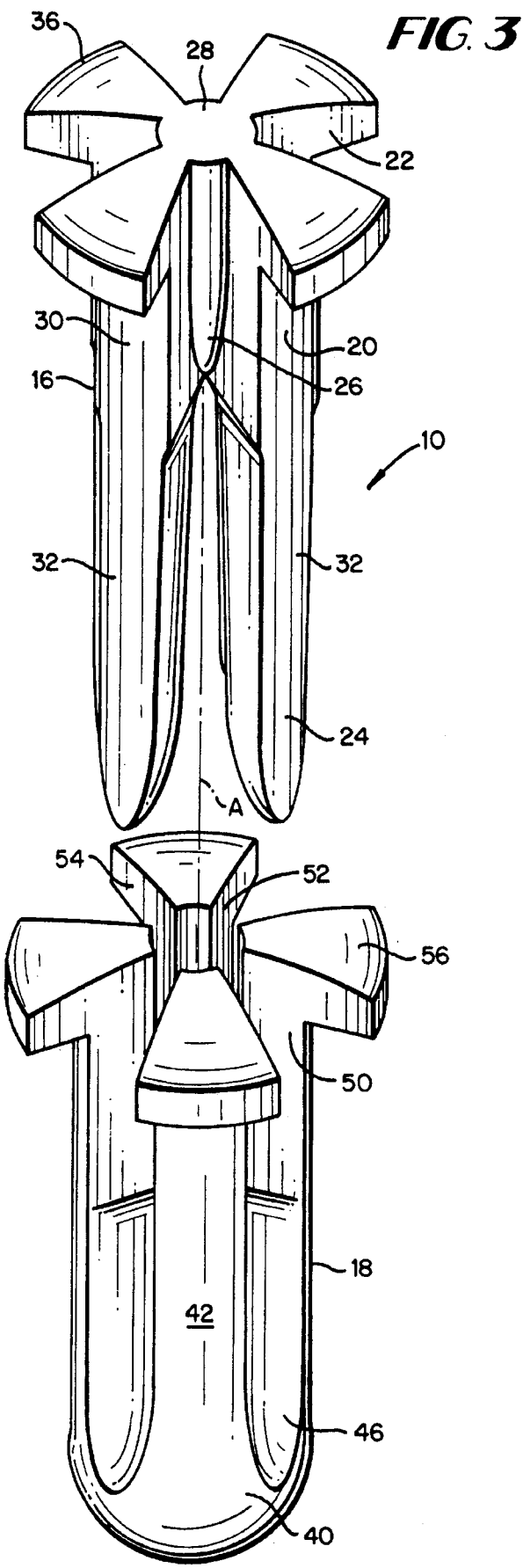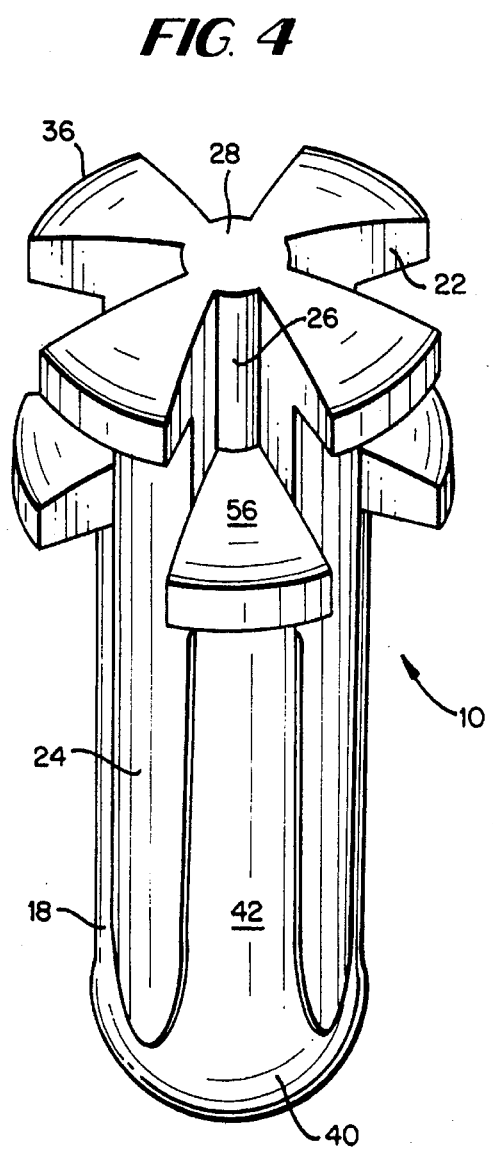

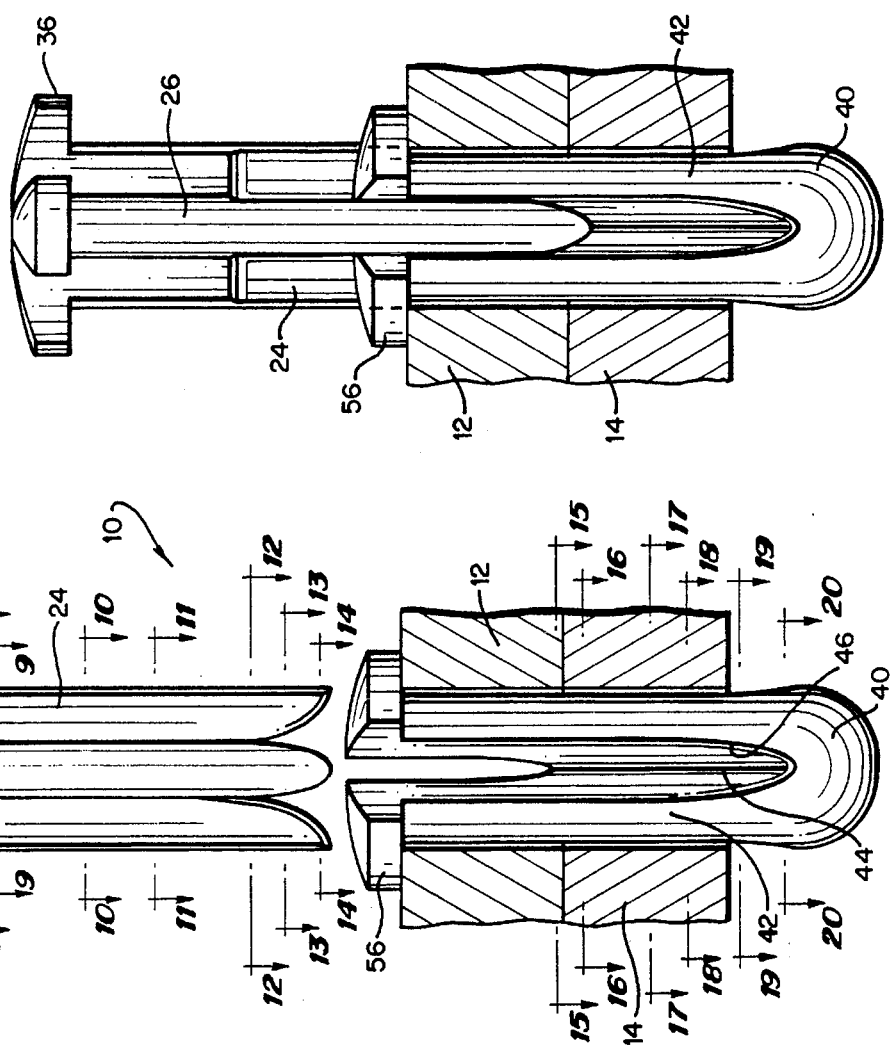
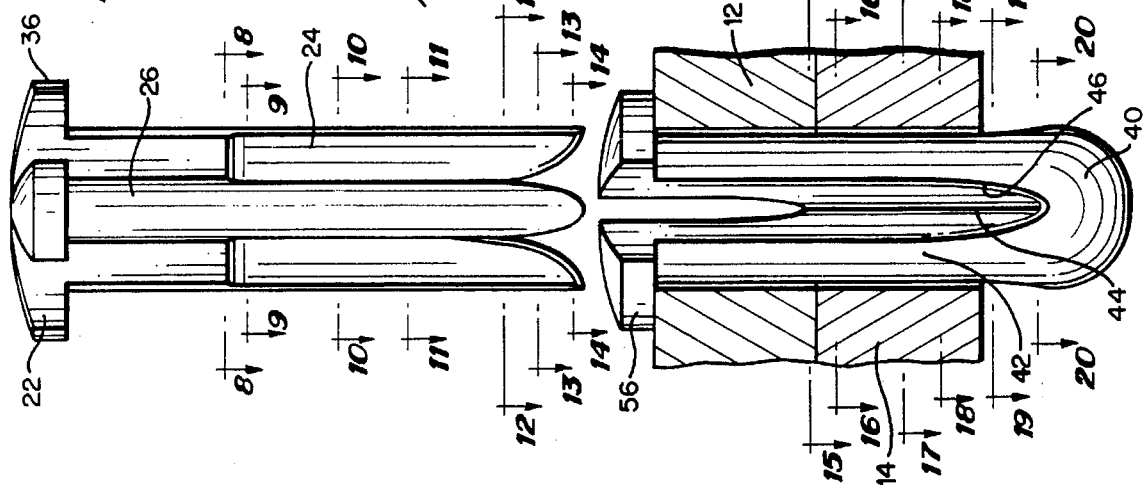

TWO-PART BLIND RIVET

TECHNICAL FIELD

The present invention relates to a rivet for connecting two or more elements one to the other and particularly relates to a two-part blind rivet for effecting a strong interlock between such elements and which rivet exhibits high tensile and shear strength.

BACKGROUND

Rivets are, of course, a well known and popular form of fastener because of their simplicity, dependability and low cost. There are many different types of rivets and many methods of applying the rivets to the materials to be joined. For example, where access is provided on both sides of the elements to be joined, a projecting end of a rivet can be repeatedly impacted while the opposite end is held in place by a bucking bar. Thus, the rivet material is displaced laterally outwardly and into contact with the side of the hole in which it is being assembled. Similarly, rivets can be squeezed into place by applying steady pressure on a header die while backing up the preformed end of the rivet with a bucking bar or holding fixture. Rivets are also provided with hollow ends or prongs. In these rivets, the prongs are bent back against the material being fastened whereby the elements joined by the riveting action are held between the rivet head and the laterally outwardly bent prongs or tubular portions of the rivet. These rivets are not particularly useful for blind holes nor do they provide high tensile strength, as most afford strength only in shear.

DISCLOSURE OF THE INVENTION

In accordance with the present invention, there is provided a blind rivet for interlocking two or more elements to one another that exhibits high tensile and shear strength and is readily and easily applied to the elements to be joined, as well as being compatible with magazine-fed power tool operation. Particularly, the two-part blind rivet of the present invention includes a first part having an intermediate body or shank with a head at one end and a plurality of legs extending from the body at its opposite end, the legs being spaced one from the other and spaced radially from an elongated axis passing through the head. The legs also extend along the shank terminating in the head. Distal end portions of the legs of the first rivet part have cam follower surfaces, for purposes to be discussed. The head of the first part also includes a plurality of laterally directed flanges. The flanges are spaced circumferentially one from the other about the head and overlie and form integral continuations of the legs extending along the shank.

The second rivet part includes a base and a pair of legs upstanding from the base and spaced circumferentially one from the other and from an elongated axis passing through the second part. The distal ends of the legs of the second rivet part terminate in laterally directed flanges forming integral continuations of and overlying the legs of the second rivet part, the flanges being spaced circumferentially one from the other and radially from the axis of the second rivet part. The base of the second rivet part includes cam surfaces between the legs for engaging the cam follower surfaces of the first part upon application of the rivet to join two or more elements to one another.

As in the case of conventional rivets, the elements to be joined to one another by the two-part blind rivet hereof are first provided with a hole for receiving the rivet parts. Additionally, the rivets hereof are depth-specific and thus particular lengths of the two-part blind rivets are provided for joining elements of different depths one to the other. The rivet hereof may, however, be useful within a limited range of depths. For example, a rivet designed for a 1" depth may function properly when the overall depth of the elements to be joined is within a range of ¾" to 1¼" or less. Consequently, it will be appreciated that the rivets are provided in different sizes or lengths for applications of different depths. Additionally, the rivets are provided in different diameters depending upon the shear forces to be withstood.

To join the elements one to the other and after a hole is formed through the elements for receiving the rivet, the second part of the rivet is inserted into the hole with the underside of the flanges thereof engaging along an outer surface of one of the elements. The first part of the rivet is then inserted into the second part by engaging the legs of the first part between the legs of the second part, i.e., in the spaces or cavities between the legs of the second part. It will be appreciated that the legs of the first part are equal in number to the legs of the second part, although the overall length of the first part is greater than the overall length of the second part. Also, the legs of the first part are generally complementary in shape to the surfaces of the legs of the second part defining the spaces between the second part legs such when the first part is partially seated in the second part, the legs of the parts lie generally complementary to one another, albeit the legs of the first part are slightly larger than the spaces between the legs of the second part.

Upon further insertion of the first part into the second part, e.g., by impact or pressure, the cam follower surfaces of the legs of the first part engage the cam surfaces of the base of the second part. Further axial insertion causes the cam surfaces to cam the distal portions of the legs of the first part in a laterally outward direction. This, in turn, forces the base of the second part away from the joined elements thereby applying a squeezing pressure to the joined elements between the head of the second part and the outwardly cammed distal ends of the legs of the first part. Upon final seating of the first part in the second part, the distal portions of the legs of the first part engage the opposite side of the elements to be joined from the head of the first part. Additionally, it will be appreciated that the flanges of the first part which overlie its legs lie in alignment with the spaces between the flanges carried by the legs of the second part as the first part is being seated in the second part. Thus, upon final seating of the first part in the second part, the flanges of the first part are interspersed between the flanges of the second part, forming essentially a unitary head with the flanges of both parts engaging the outer element and lying flush relative to one another.

In another aspect of the present invention, the legs of the first part are preferably slightly enlarged in cross-section with respect to the space between the legs of the second part. Consequently, when the first part is axially driven into the second part, the legs of the first and second parts are distorted in a laterally outward direction which together grip the elements about the hole.

In a preferred embodiment according to the present invention, there is provided a two-part rivet comprising an elongated first part having an intermediate body portion, a head adjacent one end of the body portion, and at least a pair of legs extending along the intermediate portion and from an opposite end of the body portion and spaced one from the other, the first part having a central axis passing through the body portion and the head with the legs spaced radially from the axis, the head having at least a pair of flanges spaced from one another about the axis and projecting laterally outwardly of the legs, an elongated second part having a central axis, a base and at least a pair of legs extending from the base terminating in distal end portions thereof, the legs being circumferentially spaced from one another and from the axis of the second part, the legs of the second part having at least a pair of flanges projecting from distal end portions and spaced from one another about the axis thereof and projecting laterally outwardly of the legs of the second part, the first part being axially receivable in the second part with the legs of the first part disposed between the legs of the second part, the base including a pair of cam surfaces and distal portions of the legs of the first part including cam follower surfaces, the cam follower surfaces engaging the cam surfaces in response to axial movement of the first part into the second part for displacing the distal portions of the legs of the first part laterally outwardly from between the legs of the second part to project laterally beyond the legs of the second part.

Accordingly, it is a primary object of the present invention to provide a novel and improved two-part blind rivet affording a fastener of high shear and tensile strength and which may be readily and easily applied to join two or more elements together.

BRIEF DESCRIPTION OF THE DRAWINGS

FIG. 1 is a perspective view of a two-part blind rivet constructed in accordance with the present invention, illustrated in a final seated position but omitting the elements being joined together;

FIG. 2 is a reduced side elevational view thereof illustrating the rivet securing a pair of elements one to the other and which elements are illustrated in cross-section;

FIG. 3 is a perspective view of the first and second parts of the two-part blind rivet hereof with the first part poised for insertion into the second part;

FIG. 4 is a perspective view of the blind rivet hereof with the first part partially seated in the second part;

FIGS. 5-7 are fragmentary side elevational views illustrating the manner in which the first part is inserted into the second part to join the elements to one another;

BEST MODE FOR CARRYING OUT THE INVENTION

Figure 8:
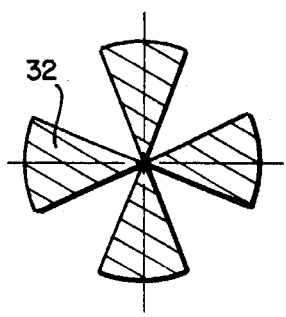
FIGS. 8-14 are cross-sectional views of the first part taken generally about on lines 8—8, 9—9, 10—10, 11—11, 12—12, 13—13 and 14—14, respectively, in FIG. 5.
Figure 9:
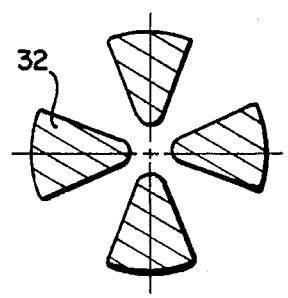
Figure 10:
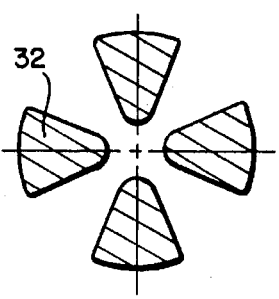
Figure 11:
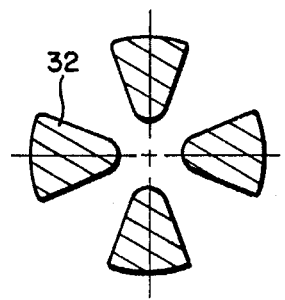
Figure 12:
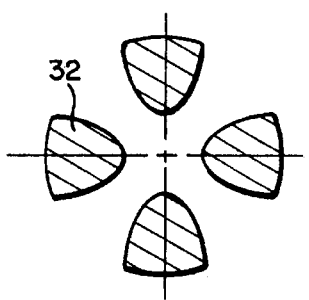
Figure 13:
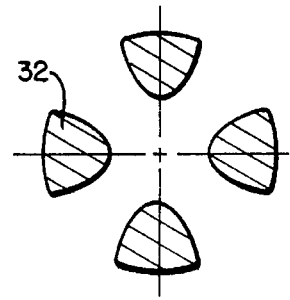
Figure 14:
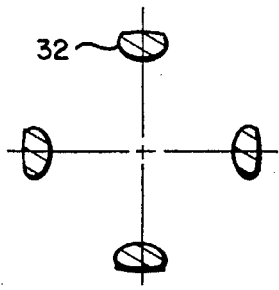
Figure 15:
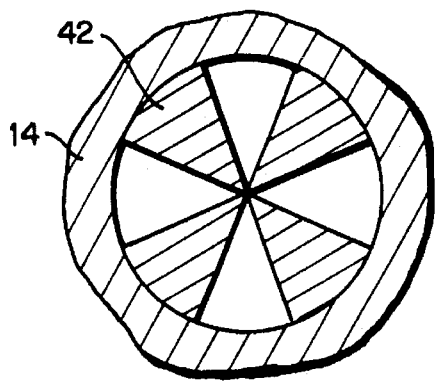
FIGS. 15-20 are cross-sectional views of the second part taken generally about on lines 15—15, 16—16, 17—17, 18—18, 19—19 and 20—20, respectively, in FIG. 5.
Figure 16:
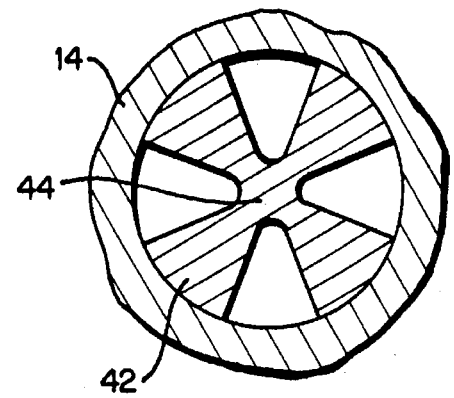
Figure 17:
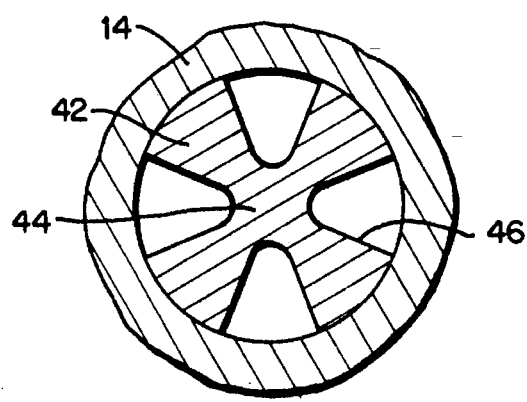
Figure 18:
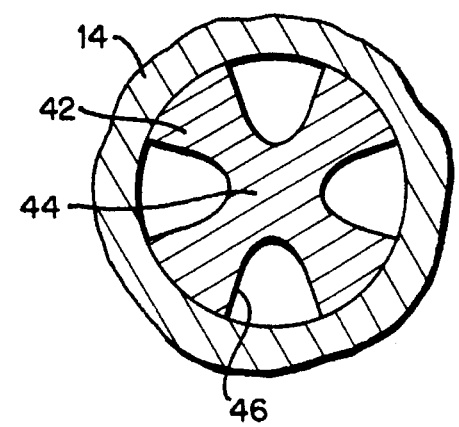
Figure 19:
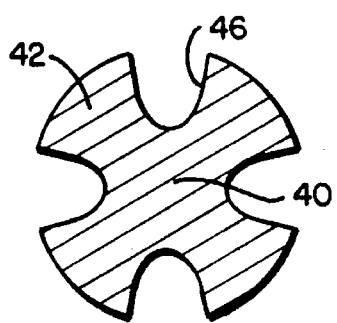
Figure 20:
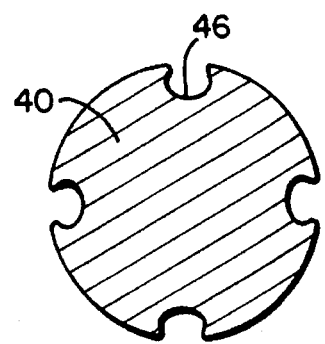

Referring now to the drawings, particularly to FIGS. 1-4, there is illustrated a two-part blind rivet according to the present invention and generally designated 10, for joining two or more elements 12 and 14 (FIG. 2) to one another. The blind rivet 10 is comprised of a first part 16 and a second part 18 wherein the first part 16 is receivable within the second part 18 to form the final fastener as described herein.

Referring particularly to FIG. 3, first part 16 includes an intermediate body section or shank 20 having a head 22 at one end and a plurality of legs 24 extending from its opposite end. The body section 20 includes a solid central core 26 which terminates in an exposed face 28 through the head 22. Body section 24 also includes upper extensions 30 of the legs 24 formed integrally with core 26. The upper leg extensions 30 project radially outwardly from the central core 26 of the first part 16 and are spaced circumferentially one from the other. Lower portions 32 of the legs 24 below the central core 26 form integral continuations of the upper leg portions 30 and are similarly spaced circumferentially one from the other. Additionally, it will be appreciated that the first and second parts 16 and 18, respectively, are elongated and lie on a common axis A when the parts are poised for coupling to one another as illustrated in FIG. 3. Thus, the legs 24 are not only circumferentially spaced one from the other but are spaced radially from the axis A, the axis A passing through the central core 26. From the foregoing, it will be appreciated that the spaces between the leg portions 30 and 32 define continuous cavities or volumes for receiving generally complementary elements or legs of the second part 18, as described hereinafter. It will also be appreciated that the number of legs 24 is determined by both the diameter of the blind rivet and the desired shear and tensile strength. A large diameter rivet with many legs will be easier to set than one with fewer and thicker legs. The number of legs may range from two legs on diametrically opposite sides of the first rivet part to approximately 12 legs, but 3 to 8 legs equally spaced one from the other about the axis A are preferred. The number of legs of the second part described below is equal to the number of legs of the first part.

Still referring to FIG. 3, the head 23 of the first part 16 includes a plurality of flanges or lugs 36 which project laterally or radially outwardly. The flanges 36 are circumferentially spaced one from the other and are in registration or vertical alignment with the legs 24. The flanges 36 as illustrated project outwardly of the outer surfaces of legs 24 and have undersides for engaging an element to be secured about its opening, as described hereafter. The sides of the flanges lie flush with the sides of the upper leg portions 30 and form radial outward continuations thereof.

Referring to FIGS. 3 and 4, the second part 18 of rivet 10 includes a substantially bulbous or inverted dome-shaped base 40 having a plurality of circumferentially spaced legs, integrally formed with the base, extending upwardly from base 40. As can be appreciated from a review of FIGS. 15-20, the legs 42 project radially outwardly from an intermediate central core or region 44 of second part 18. The central core or region 44 defines with the legs 42 chaseways 46 of decreasing volume in a downward direction towards base 40. The chaseways 46 are thus defined by concave surfaces formed by the central core 44, as well as concave surfaces formed along the sides of the legs 42. The chaseways 46 curve outwardly and their side walls defined by legs 42 curve inwardly toward one another in a direction toward base 40, as can be seen from a comparison of drawing FIGS. 17-20, with the end of the chaseway terminating in base 40.

Above the central core 44, upper portions of the legs 42 are circumferentially spaced one from the other and radially spaced from the axis A. The inner surfaces 52 of each of the upper leg portions 50 is concave and generally complementary to the exposed convex outer surface of the central core 26 of the first part 16. The upper ends of leg portions 50 terminate in a head 54 having radially outwardly directed flanges 56 circumferentially spaced one from the other and radially spaced from the axis A. The flanges 56 register and are in vertical alignment with the leg portions 50 and form integral upward continuations thereof, as well as radially outwardly directed extensions of the legs. The side faces of leg portions 50 lie flush with the side faces of flanges 56.

The first part 16 is longer than the second part 18. From a review of FIG. 4, it will be appreciated that the shape of the legs 24 and the cavities defined by the legs 24 and central core 26 of the first part 16 are generally complementary in shape to the legs 42 and the spaces between the legs 42, including the chaseways, such that the first part may be disposed in the second part, forming a substantially perfect fit with one another in a partially set position, as illustrated in FIG. 4. It will be appreciated from a review of FIGS. 8–20 that the legs 24 of the first part are slightly larger than the corresponding cavities between the legs 42 of the second part 18 such that the chaseways are distorted about the legs of the first part whereby both the first and second parts contribute to the grip or holding power of the rivet when it engages the elements as described in detail below.

Figure 21A:
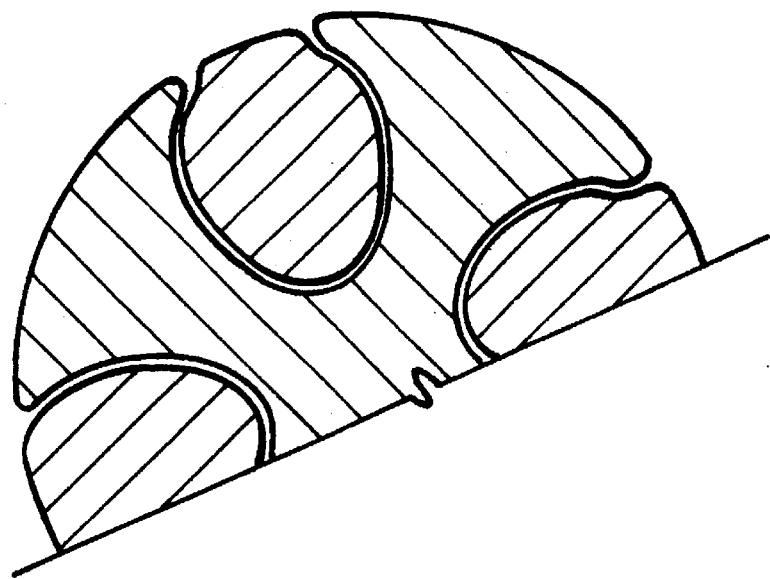
FIGS. 21a and 21b are fragmentary cross-sectional views of the legs of the blind rivet prior to and after setting of the rivet, respectively.

In use, and referring to FIGS. 1–7, a hole 70 is prepared through the elements 12 and 14 for receiving the two-part blind rivet 10 hereof. The second part is then disposed in the hole 70 to engage the undersides of the flanges 56 with the outer surface of the top element 12, and locate the bulbous portion 40 outside or beyond element 14. As noted previously, the rivet hereof is length-specific and, accordingly, the appropriate length of rivet is required to secure elements of specified thickness one to the other. With the second part 18 disposed in the hole 70, the first part 16 is driven or inserted into the second part 18. That is, the legs 24 are received in the cavities between the legs 42 of the second part 18. A manual impact or power tool may be used for driving the first part into the second part. As the first part is driven into the second part, the lateral opening defined at the lower end of each chaseway 46 and bounded by a pair of legs 42 and the inner surface of the element 14 is too small relative to the material of the leg 24 of the first part 16 to receive the leg 24. As a consequence, the lower portion of each leg 24 emerging through each lateral opening forcefully bears against both the inner surface of the work element 14 and the lower concavity of chaseway 46, thereby drawing the elements 12 and 14 tightly together and providing a primary setting action. That is, the emerging lower leg portion forces the bulbous lower end of the second part 18 in a direction away from element 14, thereby squeezing the elements 12 and 14 between the head 54 of the second part 18 and the emerging lower leg portions. Additionally, and with reference to FIGS. 21a and 21b, the legs 42 of the second part extend partially about the legs 24 of the first part prior to setting of the rivet. As the first part is driven into the second part, its slightly larger legs will cause the legs 42 of the second part to distort and essentially wrap around the legs of the first part, as illustrated in FIG. 21a. This action also slightly diametrically enlarges both parts against the surface of the hole 70.

Figure 21B:
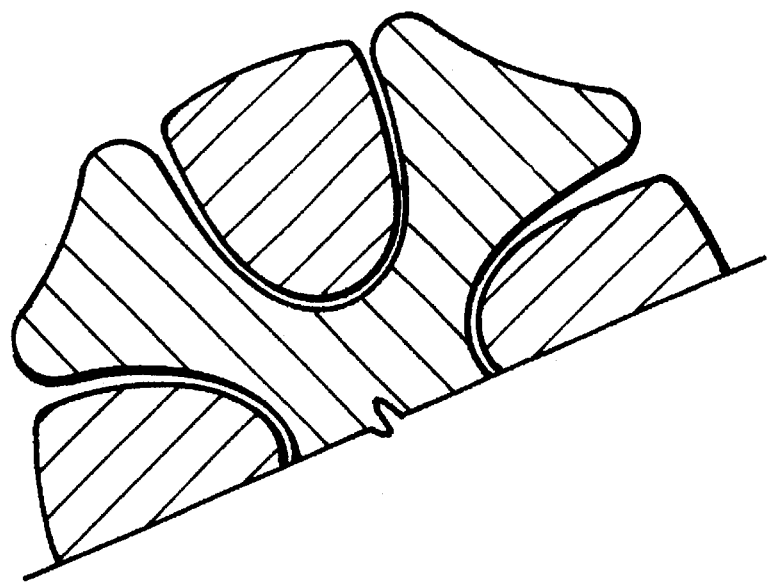

The surfaces of the first and second parts are generally complementary to one another when the first part has been driven into the position illustrated in FIG. 4, the legs 24 being slightly larger than the legs 42. Further insertion of the first part causes the distal portions of the legs 24 to cam outwardly, as illustrated in FIGS. 7 and 21b, as a result of the cam follower surfaces of the legs 24 engaging the cam surfaces of the chaseways 46. As the first part is driven to a final set position, as illustrated in FIGS. 1 and 2, it will be appreciated that because the legs 24 are aligned with the cavities and chaseways of the second part and the flanges 36 and 56 are aligned with their respective legs 24 and 42, the flanges 36 will enter the spaces between the flanges 56, as illustrated in FIG. 1. Simultaneously as the first part is driven into the set position, the distal end portions of the legs 24 project outwardly, i.e., are cold-formed, to underlie the undersurface of the innermost element 14. Consequently, the primary setting action afforded by the emergence of the ends of legs 24 through the reduced openings adjacent the cam surfaces of the chaseways 46, coupled with the outward bulging of both legs 24 and 42 and increased diameter thereof, maintain the elements 12 and 14 coupled to one another.

The first and second parts may be formed of aluminum, steel or any malleable metal alloy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A two-part rivet comprising:

an elongated first part having an intermediate body portion, a head adjacent one end of the body portion, and at least a pair of legs extending along said intermediate portion and from an opposite end of said body portion and spaced one from the other, said first part having a central axis passing through said body portion and said head with said legs spaced radially from said axis, said head having at least a pair of flanges spaced from one another about said axis and projecting laterally outwardly of said legs;

an elongated second part having a central axis, a base and at least a pair of legs extending from said base terminating in distal end portions thereof, said legs being circumferentially spaced from one another and from the axis of said second part, said legs of said second part having at least a pair of flanges projecting from distal end portions and spaced from one another about the axis thereof and projecting laterally outwardly of the legs of said second part;

said first part being axially receivable in said second part with the legs of said first part disposed between the legs of said second part, said base including a pair of cam surfaces and distal portions of the legs of said first part including cam follower surfaces, said cam follower surfaces engaging said cam surfaces in response to axial movement of said first part into said second part for displacing the distal portions of the legs of said first part laterally outwardly from between the legs of said second part to project laterally beyond the legs of said second part.

2. A rivet according to claim 1 wherein each said cam surface includes a laterally outwardly directed, generally concave surface and said cam follower on each leg of said first part includes a generally convex surface along inner portions of the legs thereof.

3. A rivet according to claim 1 wherein said legs of said first part and the legs of said second part engage one another generally along complementary surfaces prior to distal portions of the legs of said first part being displaced laterally outwardly by the engagement of said cam surfaces and said cam follower surfaces.

4. A rivet according to claim 1 wherein the flanges of said first part are received between the flanges of said second part when said first part is finally seated in said second part.

5. A rivet according to claim 4 wherein the flanges of said first and second parts lie flush with one another when the first part is fully seated in the second part.

6. A rivet according to claim 5 wherein said first part is longer in length than the length of said second part.

7. A rivet according to claim 1 wherein said legs of said first part are larger in cross-sectional dimension than the spaces between the legs of said second part whereby the legs of said first part are distorted laterally outwardly in response to axial movement of said first part into said second part.

8. A rivet according to claim 1 wherein each said cam surface includes a laterally outwardly directed, generally concave surface and said cam follower on each leg of said first part includes a generally convex surface along inner portions of the legs thereof, said legs of said first part and the legs of said second part engaging one another generally along complementary surfaces prior to distal portions of the legs of said first part being displaced laterally outwardly by the engagement of said cam surfaces and said cam follower surfaces.

9. A rivet according to claim 8 wherein the flanges of said first part are received between the flanges of said second part when said first part is finally seated in said second part.

10. A rivet according to claim 9 wherein the flanges of said first and second parts lie flush with one another when the first part is fully seated in the second part.

11. A rivet according to claim 10 wherein said first part is longer in length than the length of said second part.

12. A rivet according to claim 9 in combination with two elements to be joined to one another and having registering holes for receiving said rivet, the distal portions of the legs of the first part being larger than openings defined between the legs of said second part, said cam surfaces and an exposed surface of one of said elements closest to said base such that the distal portions of the legs of said first part emerging through said openings cooperates with the second part to draw said elements together.

* * * * *